United States Patent
Wang et al.

(10) Patent No.: US 12,060,080 B2
(45) Date of Patent: *Aug. 13, 2024

(54) PUDDLE OCCUPANCY GRID FOR AUTONOMOUS VEHICLES

(71) Applicant: WAYMO LLC, Mountain View, CA (US)

(72) Inventors: Yuchi Wang, Ann Arbor, MI (US); Michael James, Northville, MI (US); Robert Chen, San Francisco, CA (US); Derrick Dominic, Canton, MI (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/310,620

(22) Filed: May 2, 2023

(65) Prior Publication Data

US 2023/0264715 A1    Aug. 24, 2023

Related U.S. Application Data

(63) Continuation of application No. 17/118,758, filed on Dec. 11, 2020, now Pat. No. 11,673,581.

(51) Int. Cl.
*B60W 60/00* (2020.01)
*B60W 40/06* (2012.01)
(Continued)

(52) U.S. Cl.
CPC ...... *B60W 60/00184* (2020.02); *B60W 40/06* (2013.01); *B60W 60/001* (2020.02);
(Continued)

(58) Field of Classification Search
CPC .......... B60W 60/00184; B60W 40/06; B60W 60/001; B60W 60/00182; B60W 2420/52;
(Continued)

(56) References Cited

U.S. PATENT DOCUMENTS 9,090,264 B1   7/2015  Zhao et al.
11,021,159 B2  6/2021  Herman et al.
(Continued)

FOREIGN PATENT DOCUMENTS

WO    2020057801 A1    3/2020

OTHER PUBLICATIONS

Fredric C. Gey, Inferring Probability of Relevance Using the Method of Logistic Regression, presented at SIGR Jul. 3-6, 1994, edited by Croft and van Rijsbergen, pp. 222 thru 231 (Year: 1994).

*Primary Examiner* — Dale W Hilgendorf
(74) *Attorney, Agent, or Firm* — Botos Churchill IP Law

(57) ABSTRACT

Aspects of the disclosure relate to generating a puddle occupancy grid including a plurality of cells. For instance, a first probability value for a puddle being located at a first location generated using sensor data from a first sensor may be received. A second probability value for a puddle being located at a second location generating using sensor data from a second sensor different from the first sensor may be received. A first cell may be identified from the plurality of cells using the first location. The first cell may also be identified using the second location. A value for the cell may be generated using the first probability value and the second probability value.

20 Claims, 11 Drawing Sheets

(51) Int. Cl.
*G06F 18/23* (2023.01)
*G06F 18/2415* (2023.01)
*G06V 20/56* (2022.01)

(52) U.S. Cl.
CPC ....... *B60W 60/00182* (2020.02); *G06F 18/23* (2023.01); *G06F 18/2415* (2023.01); *G06V 20/56* (2022.01); *G06V 20/588* (2022.01); *B60W 2420/408* (2024.01)

(58) Field of Classification Search
CPC .... G06K 9/6218; G06K 9/6277; G06V 20/56; G06V 20/588
See application file for complete search history.

(56) References Cited

U.S. PATENT DOCUMENTS

| | | | |
|---|---|---|---|
| 11,673,581 B2 * | 6/2023 | Wang | B60W 40/06 701/23 |
| 2014/0081507 A1 | 3/2014 | Urmson et al. | |
| 2014/0081573 A1 | 3/2014 | Urmson et al. | |
| 2014/0307247 A1 * | 10/2014 | Zhu | B60W 40/064 342/54 |
| 2015/0334385 A1 | 11/2015 | Takemura et al. | |
| 2016/0167668 A1 * | 6/2016 | Prokhorov | B60W 60/0053 701/302 |
| 2016/0178802 A1 | 6/2016 | Stainvas Olshansky et al. | |
| 2017/0124402 A1 | 5/2017 | Tanaka et al. | |
| 2017/0293814 A1 | 10/2017 | Elie et al. | |
| 2018/0188043 A1 * | 7/2018 | Chen | G06T 7/593 |
| 2018/0194286 A1 | 7/2018 | Stein | |
| 2018/0341265 A1 | 11/2018 | Myers et al. | |
| 2019/0325595 A1 | 10/2019 | Stein et al. | |
| 2019/0351911 A1 * | 11/2019 | Anezaki | B60W 50/14 |
| 2019/0387216 A1 * | 12/2019 | Hicks | G01S 17/10 |
| 2019/0392697 A1 | 12/2019 | Perez Barrera et al. | |
| 2020/0089236 A1 * | 3/2020 | Doemling | G05D 1/0212 |
| 2020/0150652 A1 | 5/2020 | Urano et al. | |
| 2020/0150655 A1 * | 5/2020 | Artes | G05D 1/0016 |
| 2020/0189463 A1 * | 6/2020 | Kunz | B60W 40/06 |
| 2020/0257931 A1 * | 8/2020 | Yershov | B60W 60/0011 |
| 2021/0018317 A1 | 1/2021 | Noma et al. | |
| 2021/0278851 A1 * | 9/2021 | Van der Merwe | G05D 1/0246 |
| 2021/0285867 A1 * | 9/2021 | Dumler | G06V 20/56 |
| 2021/0354690 A1 | 11/2021 | Yershov et al. | |
| 2021/0354723 A1 | 11/2021 | McCool et al. | |
| 2021/0383269 A1 * | 12/2021 | Zhou | G05D 1/0231 |
| 2022/0028277 A1 | 1/2022 | Patnaik et al. | |
| 2022/0057232 A1 | 2/2022 | Shen et al. | |
| 2022/0153276 A1 | 5/2022 | Steyer et al. | |
| 2022/0185294 A1 | 6/2022 | Rakotovao Andriamahefa | |
| 2022/0215673 A1 | 7/2022 | Fujiwara et al. | |
| 2022/0281456 A1 * | 9/2022 | Giovanardi | G01S 17/931 |
| 2024/0001962 A1 * | 1/2024 | Horita | G08G 1/0125 |

* cited by examiner

PUDDLE OCCUPANCY GRID FOR AUTONOMOUS VEHICLES

CROSS REFERENCE TO RELATED APPLICATIONS

The present application is a continuation of U.S. patent application Ser. No. 17/118,758, filed Dec. 11, 2020, now issued as U.S. Pat. No. 11,673,581, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

Weather can be a significant contributor to operational downtime for autonomous vehicles, and especially rain and puddles. Puddles may result in splashes, hydroplaning, and fouling of the vehicle's sensors. As a result, puddles can result in a need to stop or limit driving in an autonomous driving mode. Enabling an autonomous vehicle to detect puddles with onboard sensors starts to address these limitations.

BRIEF SUMMARY

Aspects of the disclosure provide a method of generating a puddle occupancy grid including a plurality of cells. The method includes receiving, by one or more processors, a first probability value for a puddle being located at a first location generated using sensor data from a first sensor; receiving, by the one or more processors, a second probability value for a puddle being located at a second location generating using sensor data from a second sensor different from the first sensor; identifying, by the one or more processors, a first cell from the plurality of cells using the first location; identifying, by the one or more processors, the first cell from the plurality of cells using the second location; generating, by the one or more processors, a value for the first cell using the first probability value and the second probability value; and using, by the one or more processors, the value for the first cell to control a vehicle in an autonomous driving mode.

In one example, the first sensor is a LIDAR sensor, and the second sensor is a camera sensor. In another example, generating the value for the first cell includes first incorporating the first probability value and subsequently incorporating the second probability value. In this example, incorporating the first probability value includes using an inverse logistic regression function. In addition, incorporating the second probability value includes using the inverse logistic regression function. In another example, using the value for the first cell includes using a Sigmoid function to convert the value to a probability of the first cell containing a puddle. In another example, the method also includes sending the value for the first cell to one or more remote computing devices. In this example, the method also includes receiving values for cells of the occupancy grid from the one or more remote computing devices, and wherein controlling the vehicle is further based on the received values. In addition, using the value for the first cell includes clustering cells of the occupancy grid, and wherein controlling the vehicle is further based on the clustered cells. In addition, the first probability value and the second probability value are generated at different points in time.

Another aspect of the disclosure provides, a system for populating a puddle occupancy grid including a plurality of cells. The system includes one or more processors configured to receive a first probability value for a puddle being located at a first location generated using sensor data from a first sensor; receive a second probability value for a puddle being located at a second location generating using sensor data from a second sensor different from the first sensor; identify a first cell of the plurality of cells using the first location; identify the first cell of the plurality of cells using the second location; generate a value for the first cell using the first probability value and the second probability value; and use the value for the first cell to control a vehicle in an autonomous driving mode.

In one example, the first sensor is a LIDAR sensor, and the second sensor is a camera sensor. In another example, generating the value for the first cell includes first incorporating the first probability value and subsequently incorporating the second probability value. In this example, the one or more processors are further configured to incorporate the first probability value by using an inverse logistic regression function. In addition, the one or more processors are further configured to incorporate the second probability value by using the inverse logistic regression function. In another example, the one or more processors are further configured to use the value for the first cell by using a Sigmoid function to convert the value to a probability of the first cell containing a puddle. In another example, the one or more processors are further configured to send the value for the first cell to one or more remote computing devices. In this example, the one or more processors are further configured to receive values for cells of the occupancy grid from the one or more remote computing devices, and wherein controlling the vehicle is further based on the received values. In another example, the one or more processors are further configured to use the value for the first cell by clustering cells of the occupancy grid, and wherein controlling the vehicle is further based on the clustered cells. In another example, the first probability value and the second probability value are generated at different points in time.

DETAILED DESCRIPTION

Overview

Figure 1:
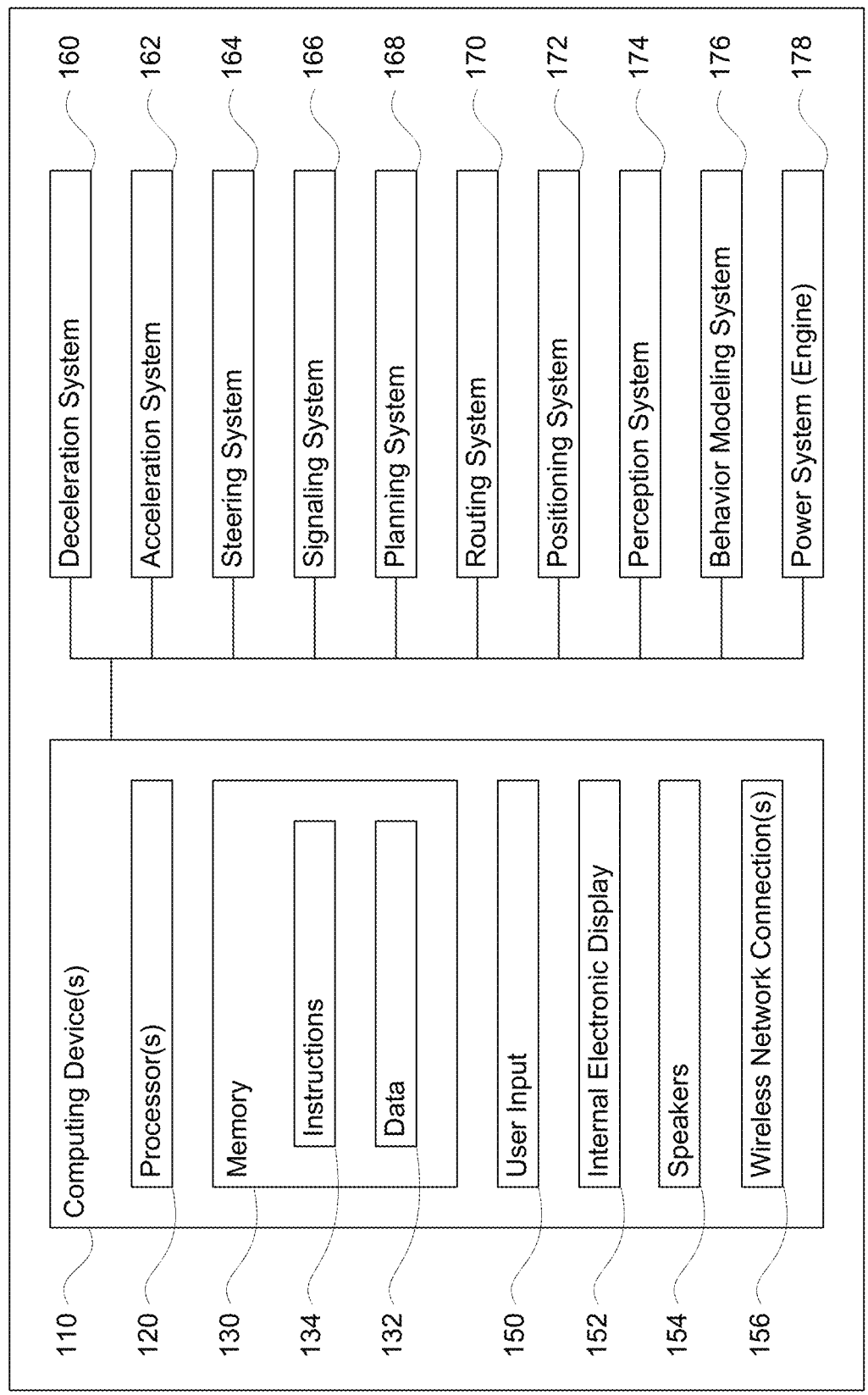
FIG. 1 is a functional diagram of an example vehicle in accordance with an exemplary embodiment.

The technology relates to onboard puddle detection for autonomous vehicles using an occupancy grid. Weather can be a significant contributor to operational downtime for autonomous vehicles, and especially rain and puddles. Puddles may result in splashes, hydroplaning, and fouling of the vehicle's sensors. As a result, puddles can result in a need to stop or limit driving in an autonomous driving mode. Enabling an autonomous vehicle to detect puddles with onboard sensors starts to address these limitations. But combining this data using an occupancy grid can provide even more details about an autonomous vehicle's environment.

Various sensors, including cameras and LIDAR sensors may be used to detect and identify the locations and dimensions of puddles. For both cameras and LIDAR sensors, there are many methods of converting the raw data into usable detection outputs. For instance, a machine learning approach, for example using a deep net, may be used to classify entire camera images (includes puddle or does not include puddle), to detect puddles by generating bounding boxes around puddles, or to segment the camera images and classify each individual pixel as belonging to a puddle or not. From these outputs, structure tests may be used to determine the probability of each pixel in a camera image corresponding to a puddle. Similar approaches may be used for returns from a LIDAR sensor.

An occupancy grid may be a 2D grid where each cell encodes the probability of a puddle being within that cell. The occupancy grid may be a fixed grid, that may be predetermined and stored with map information used by the vehicle. The occupancy grid may be "filled" using the probabilities of a pixel belonging to a puddle and the probabilities of a return belonging to a puddle. The corresponding probabilities for these pixels and returns may then be used to determine a likelihood of each cell containing a puddle. The likelihood for each cell may then be stored in that cell in the occupancy grid.

In some instances, a clustering algorithm may be used to cluster or group together high-probability cells. The clustering may also incorporate additional context from the elevation map. Larger clusters of cells may be used to determine an approximate outline of larger puddles. In some instances, some smoothing may be done to account for errors in the projection of the camera image onto the elevation map.

The resulting occupancy grid may be used in various ways. For example, the occupancy grid may be used as input to the vehicle's motion control, planning, and perception systems. This may enable the vehicle to avoid the puddle and/or reduce the effects of the puddle on the control of the vehicle. In addition, the occupancy grid may be shared with other remote systems. For example, the occupancy grid may be shared with a server computing system which may generate a larger puddle map and share such information with other vehicles of a fleet of autonomous vehicles. In addition, vehicles can receive this information from the server computing devices and/or via vehicle-to-vehicle communications and incorporate this information into its own local puddle map in order to enable the vehicle to make better filtering, motion control, and routing decisions.

The features described herein may provide a useful, simple and practical way to map puddles using data generated from different types of sensors. For instance, using an occupancy grid may allow for the probability to be updated from different sensor readings in a way that is probabilistically accurate. In this regard, if a puddle is detected in a camera image or LIDAR sensor returns and then again in the following camera image or LIDAR sensor returns or even in a different sensor, this increases the likelihood that a puddle actually exists. The occupancy grid thus provides a framework for modeling that belief. Using an occupancy grid, a single 2D "puddle map" may be constructed from a variety of different sensors and timestamps.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as BLUETOOTH, BLUETOOTH low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2:
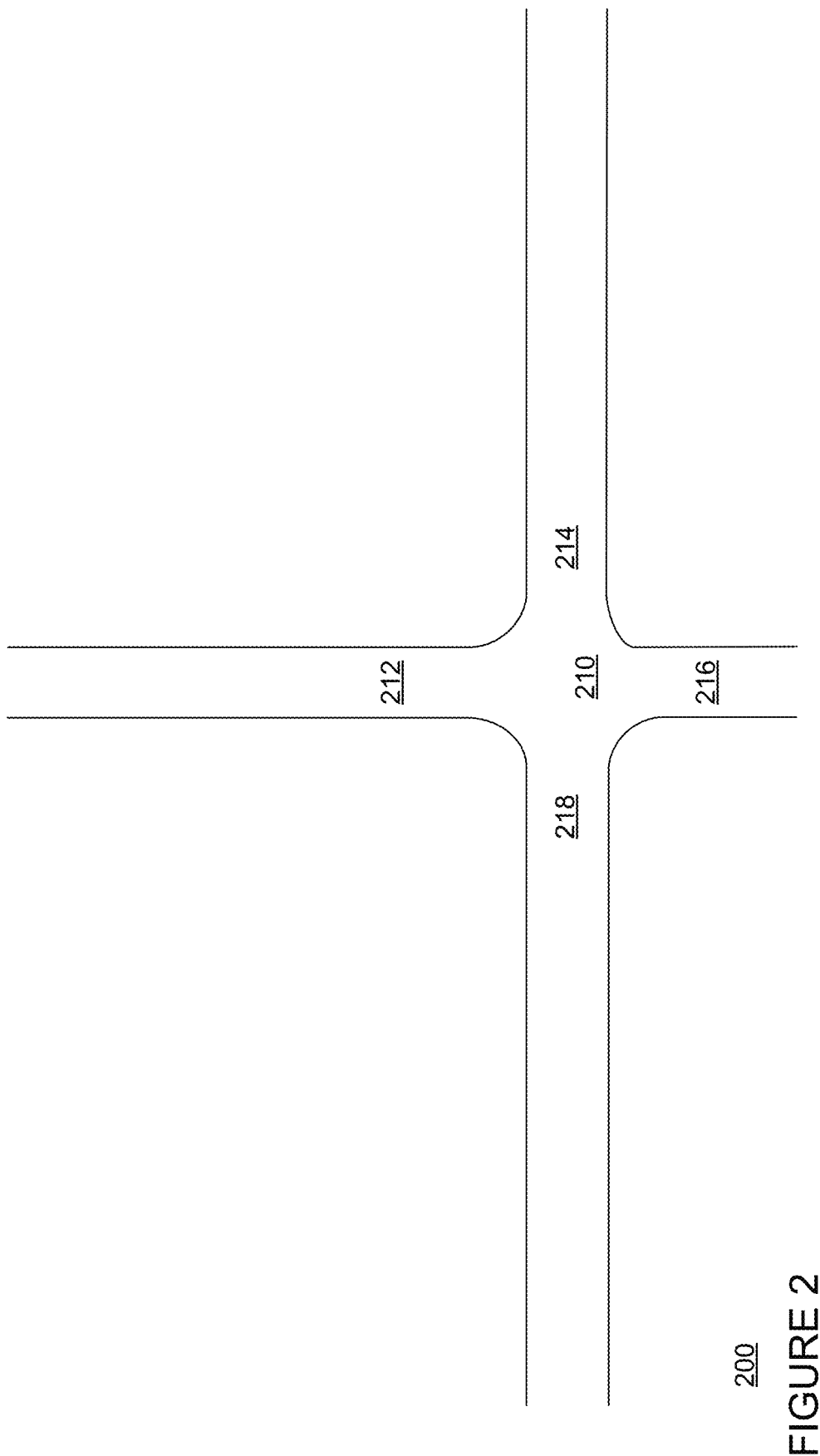
FIG. 2 is an example of map information in accordance with aspects of the disclosure.

FIG. 2 is an example of map information 200 for a section of roadway including intersection 210 at which four roads 212, 214, 216, 218 intersect. The map information 200 may be a local version of the map information stored in the memory 130 of the computing devices 110. Other versions of the map information may also be stored in the storage system 450 discussed further below. In this example, the map information 200 includes information identifying representing the shape, location, and other characteristics of roads 212, 214, 216, 218, though where applicable, the map information may include other information such as lane lines, traffic signal lights, crosswalks, traffic control signs (e.g. stop signs, yield signs, etc.), as well as other details useful for making driving decisions.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the map information 200 to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
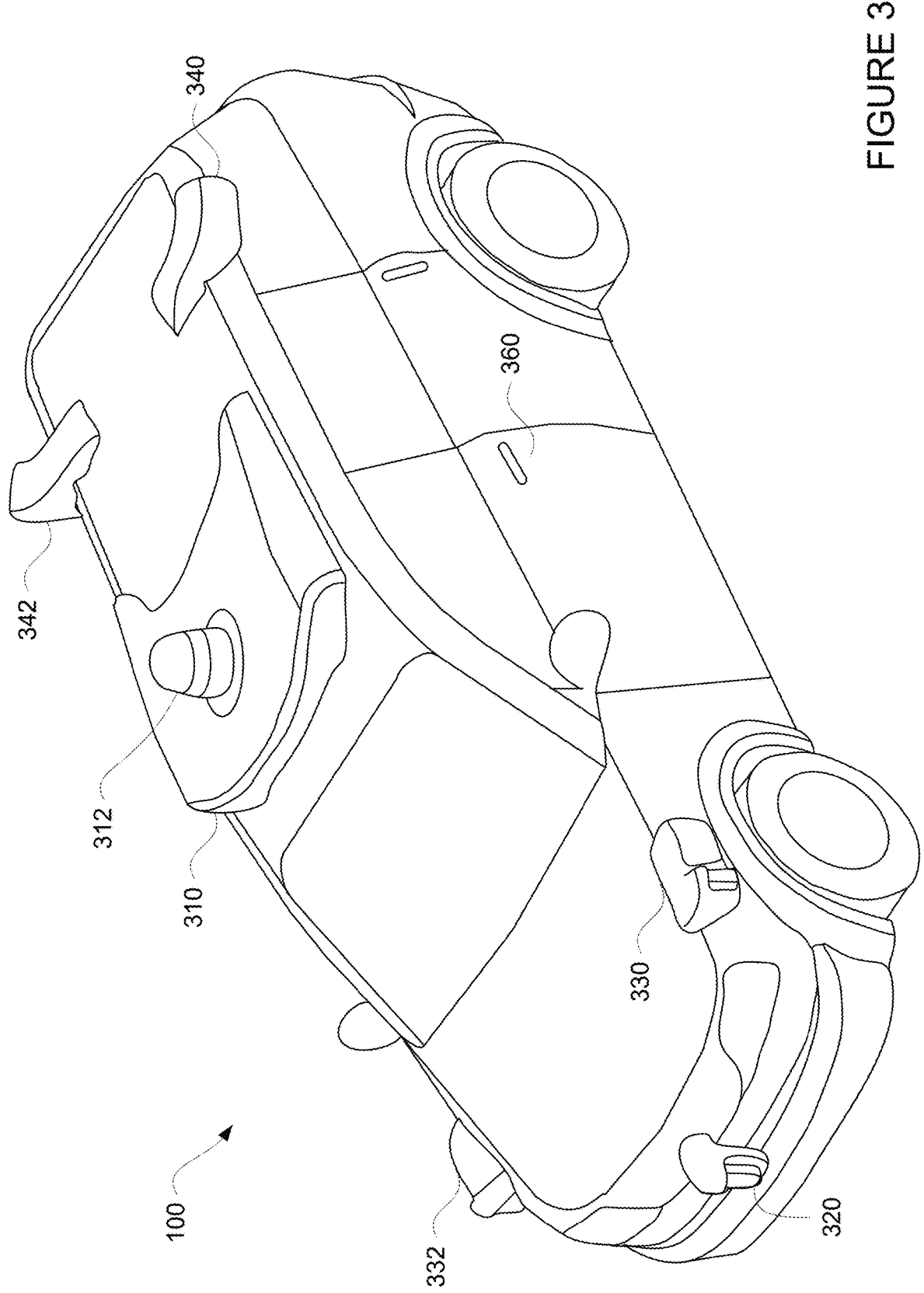
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
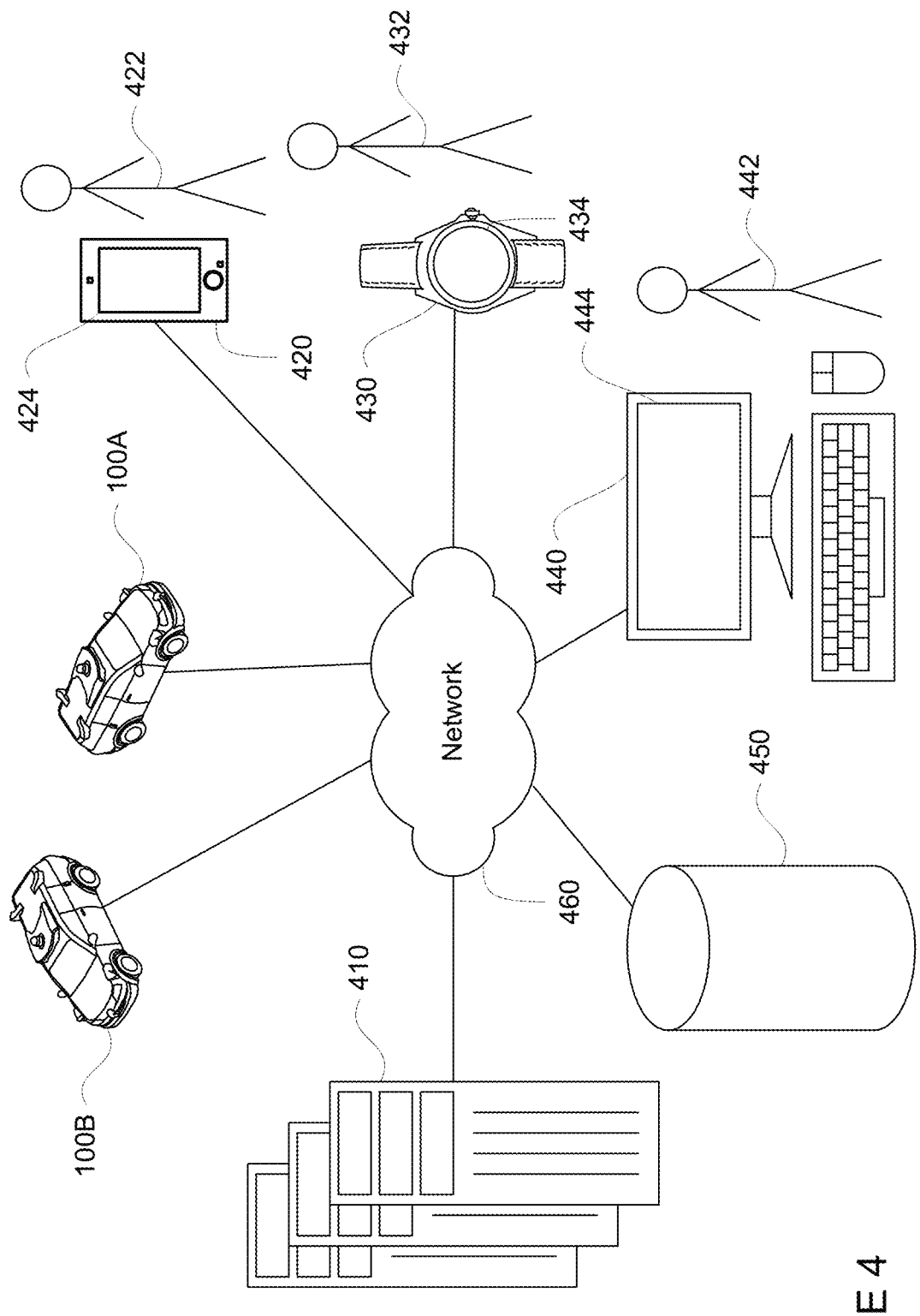
FIG. 4 is a pictorial diagram of an example system in accordance with aspects of the disclosure.
Figure 5:
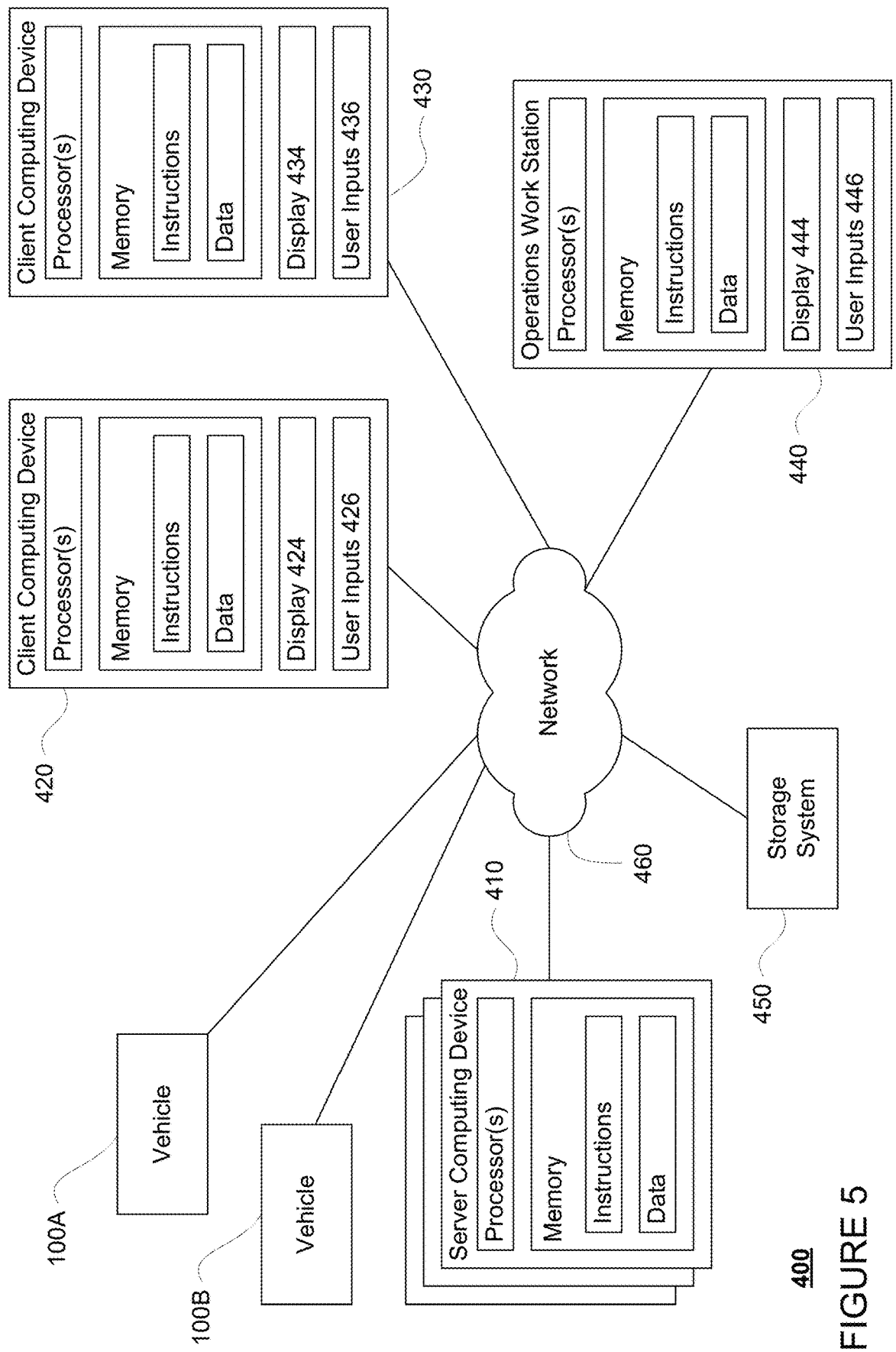
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth®, Bluetooth® LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

The server computing devices 410 may also track the state of the vehicles of the fleet using information that is periodically broadcast by the vehicles, specifically requested by the server computing devices provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose (position/location and orientation), lane information (i.e., in what lane the vehicle is currently traveling), as well as other information, such as whether the vehicle is currently providing transportation services, experiencing any errors or problems, etc. This information may be stored, for example, in the storage system 450.

As shown in FIG. 5, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

An occupancy grid may be a two-dimensional (2D) grid where each cell encodes the probability of a puddle being within that cell. The occupancy grid may be a fixed grid, that may be predetermined and stored with map information used by the vehicle. For example, a 10 cm×10 cm (or larger or smaller) grid resolution can be fixed in order to avoid the need to reproject the grid at different points in time. In this regard, each cell may include corresponding real-world coordinates. These coordinates may be set to latitude and longitude pairs, or with altitude if a three-dimensional (3D) occupancy grid is used, or other coordinate systems. In some instances, the cells of the grid may be S2 cells the level of which is selected based upon the desired dimensions of each cell.

Figure 6:
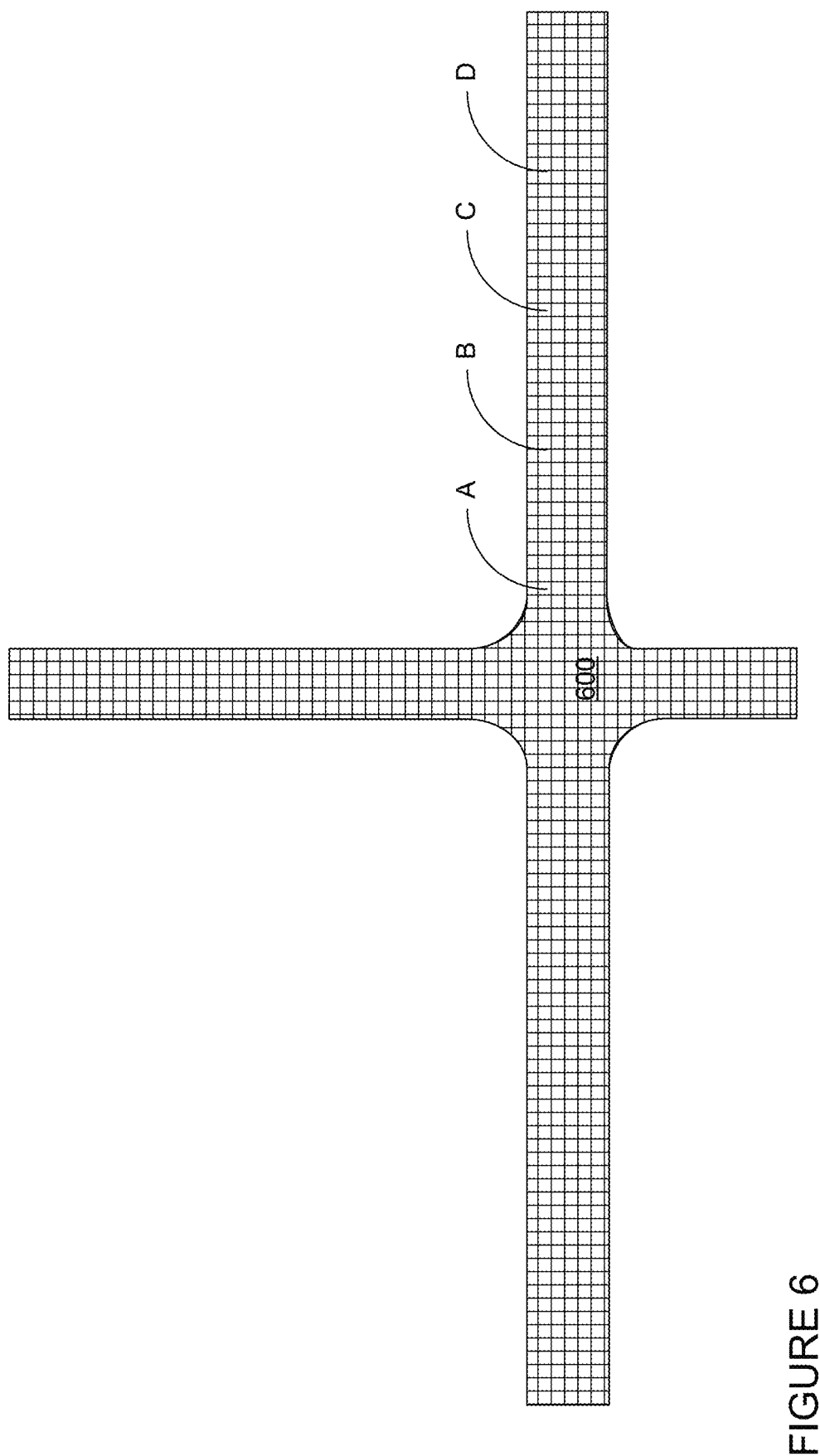
FIG. 6 is an example occupancy grid in accordance with aspects of the disclosure.

The occupancy grid can be used to combine data with different timestamps from different sensors, such as from LIDAR sensors, different cameras, etc. into a more robust understanding where puddles are likely to be located. FIG. 6 is an example occupancy grid 600 corresponding to the area of the intersection 210 and road 212. Occupancy grid includes a plurality of cells A-D (only a few being labeled for simplicity). As depicted, the map information 200 may be used to limit the bounds of the occupancy grid to only drivable surfaces (e.g. paved and unpaved road surfaces, shoulder areas, etc.), however, an occupancy grid may go beyond the drivable surface to include sidewalks and or areas beyond. In addition, although the occupancy grid is shown as 2D, the occupancy grid can also be 3D as noted above.

Figure 10:
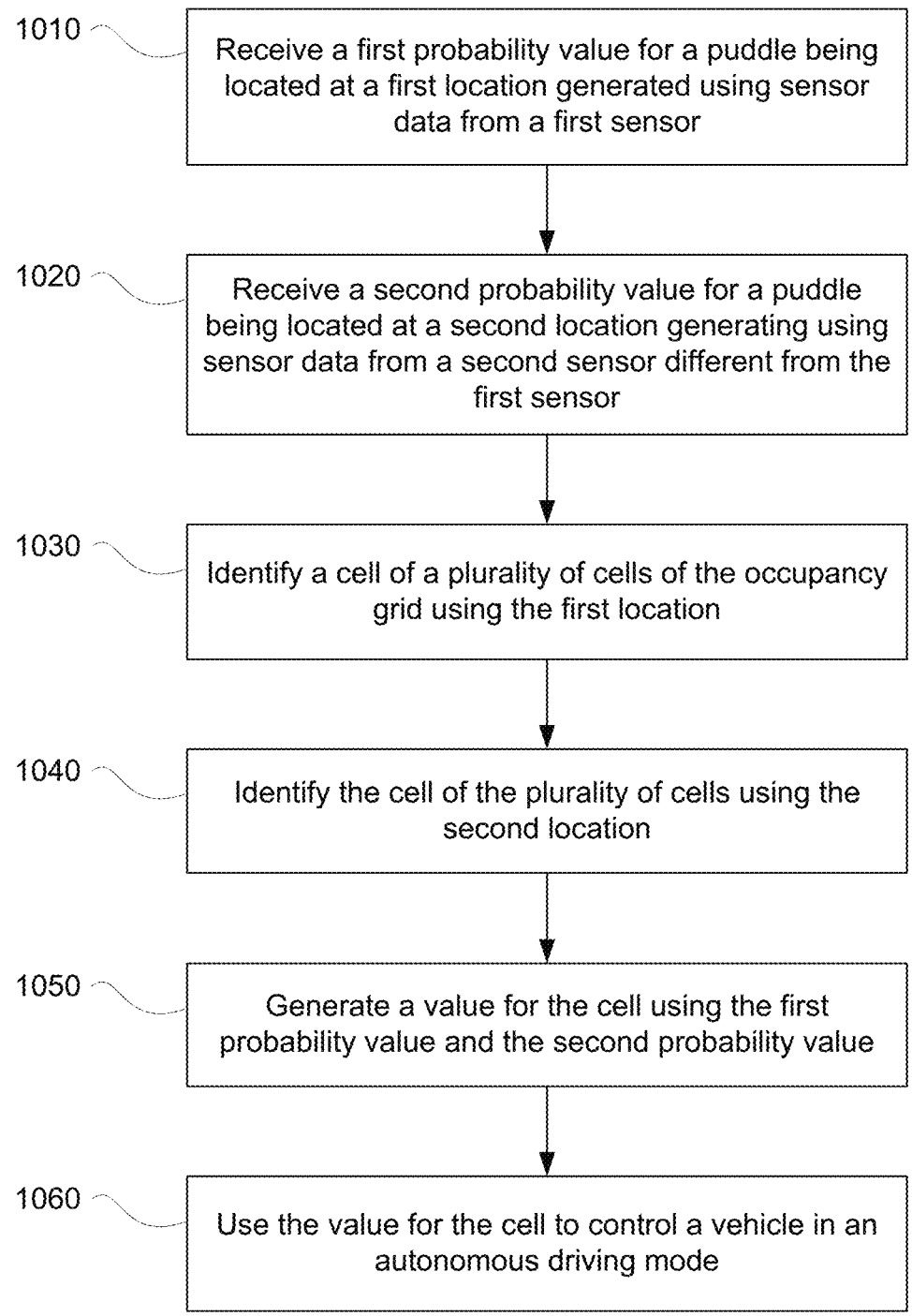
FIG. 10 is an example flow diagram in accordance with aspects of the disclosure.

FIG. 10 is an example flow diagram 1000 for generating a puddle occupancy grid including a plurality of cells, which may be performed by one or more processors of a computing device, such as processors 120 of computing devices 110. Turning to block 1010, a first probability value for a puddle being located at a first location generated using sensor data is received from a first sensor. At block 1020, a second probability value for a puddle being located at a second location generated using sensor data is received from a second sensor different from the first sensor.

Figure 7A:
FIGS. 7A and 7B is are examples of sensor data in accordance with aspects of the disclosure.
Figure 7B:
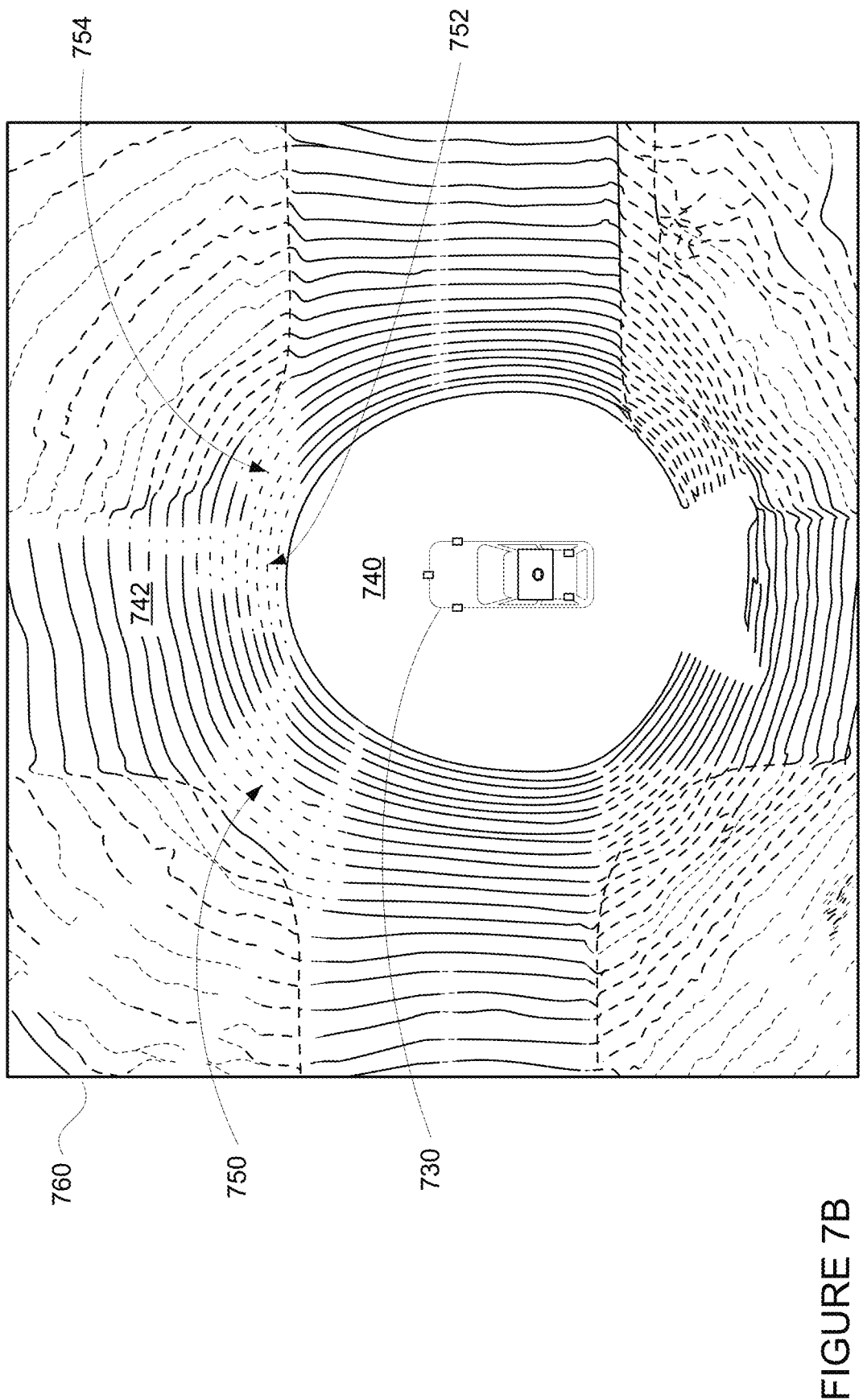

Various sensors of the perception system 174, including cameras and LIDAR sensors may be used to detect and identify the locations and dimensions of puddles. This data may be published by the perception system 174 or otherwise made available to other systems of the vehicle including the processors 120 of the computing devices 110. FIG. 7A is an example camera image 700 of a side perspective view of intersection 710 and a road 712 extending away from the intersection which correspond to the intersection 210 and road 212 of FIG. 2, respectively. In this image, vehicle 100 is entering intersection 710 from a road corresponding to road 214. In addition, there are puddles 720, 722, 724. FIG. 7B is an example representation 760 of aspects of LIDAR scan data represented in a top-down view with a representation 730 of vehicle 100 intersection 740 and a road 742 extending away from the intersection which correspond to the intersection 210 and road 212 of FIG. 2, respectively. In this representation, vehicle 100 is entering intersection 740 from a road corresponding to road 214. In addition, there are puddles represented by dashed-lines in areas 750, 752, 754.

As an example, the first sensor may be a LIDAR sensor and the second sensor may be a camera sensor. Alternatively, the first sensor may be a first type of camera and the second sensor may be a second type of camera. For instance, a combination of different cameras, such as an RBG polarization camera and a long wave infrared camera may provide different types of camera images. These cameras may provide a contrast difference between the ground surface (e.g. a rough texture of the road surface) and the puddle surface which may be clearer and more reflective. For example, the greater the contrast, the greater the probability of a pixel being a puddle and the lesser the contrast, the lesser the probability of a pixel being a puddle.

In addition, the appearance of puddles may change with range and different angles of incidence, the appearance of a puddle may change. For example at certain angles, the surface of a puddle may act as a mirror so the puddle would be brighter or dimmer than its surroundings or reflections may disappear and the road surface underneath may become more visible. In this regard, different sensors may be better situated to detect puddles at different points in time. Thus, by combining observations or data from different sensors captured at different times (e.g. with different timestamps) into an occupancy grid, the vehicle 100 may be able to create a better representation of puddles in the vehicle's environment.

In addition, stereo cameras may be used to provide some additional information since they also produce the range per pixel. For puddles at high incidence angles, this would discontinuities in a range camera image from the reflections on the puddle surface. In other words, differences in the height of reflections as compared to the road surface may be large enough to be detected using the elevation map. For instance, if there is what appears to be a hole in the range camera image, this area may correspond to a reflection from a puddle surface.

LIDAR sensors generate beams of light which can result in LIDAR returns or light reflected from a surface and returning to the sensor. Each LIDAR return may contain information about the time (e.g. timestamp), received intensity, direction, and range of the surface. Puddles have a characteristic appearance in terms of both intensity and range, based on the distance from the sensor. For example, puddle surfaces are not Lambertian and at larger angles of incidence, turn into a reflective surface. This means that at longer ranges, puddles either fail to show up as returns or show up as reflections if the laser shot reflected off the puddle and hit something else in the environment. At shorter ranges, the sensors have enough power such that returns may be reflected on the surface of the puddle, but due to their non-Lambertian property, these returns will have a significantly lower intensity than returns from a dry road. Additionally, because puddles are reflective, second returns may also be received as reflections.

Each of the camera and LIDAR sensors described above may "see" or detect puddles in their native sensor space. These observations of a puddle may include a probability of a puddle existing at a given location. For RGB polarization cameras, this would be a 2D camera image with 3 channels. For LIDAR sensors, this could be a 2D image with multiple channels, depending on what measurements are included in the channels. In both cases, the native format of the sensor is not immediately useful for describing the location of the puddle. Additionally, the static nature of puddles may be leveraged and sensor data (e.g. different measurements) can be combined over time. To accurately encode the spatial information and perform fusion of sensor measurements, an occupancy grid may be used. In order to generate an occupancy grid, the probability of a puddle being at any given location must be determined.

For both cameras and LIDAR sensors, the perception system 174 may utilize various methods of converting the raw sensor data into usable detection outputs. In this regard, the perception system 174 may publish the probability of each pixel from a camera and each LIDAR return corresponding to a puddle. Thus, the sensor data that is used to populate the occupancy grid is both in the same format and normalized.

For instance, a machine learning approach, for example using a deep net or other model, may be used to classify entire camera images (includes puddle or does not include puddle), to detect puddles by generating bounding boxes around puddles, or to segment the camera images and classify each individual pixel as belonging to a puddle or not. From these outputs, structure tests may be used to determine the probability of each pixel in a camera image corresponding to a puddle. Similar approaches may also be used for LIDAR returns from a LIDAR sensor. In other words, a deep net or other model may be used to classify LIDAR returns by generating bounding boxes around puddles and outputting a likelihood of each LIDAR return (or groups of LIDAR returns) belonging to a puddle. In this regard, the model may be generated and trained.

In other instances, heuristics may be used by the perception system 174 to determine the probability of a pixel in a camera image belonging to a puddle, though this may require more manual tuning. A threshold-based approach may be sufficient to estimate probability based on the contrast in the camera image. With such an approach, values of each pixel may be compared to a plurality of thresholds to determine whether that pixel belongs to a puddle. For example, a lower and an upper threshold on the contrast may be used, and a mapping may be defined (e.g. manually calibrated with structural test) from contrast to probability of a pixel belonging to a puddle between these two thresholds. It may be that the two thresholds represent a range between which human operators believe that the contrast value can provide useful information on the presence of puddles, and that outside of this range, the contrast value would not be used. As another example, vertical reflections may be identified in images when they appear past certain incident angles. The stronger the reflection match, the higher the probability of a pixel belonging to a puddle. Of course, due to the differences in angles in different images, not seeing a reflection does not necessarily mean that there is no puddle. In such cases, a threshold may be set on incident angles below which such a method would not be used. Other camera image processing techniques that can provide a probability of a pixel belonging to a puddle may also be used.

Returning to FIG. 10, at block 1030, a first cell is identified from the plurality of cells using the first location, and at block 1040, the first cell is also identified from the plurality of cells using the second location. To populate the occupancy grid 600, the computing devices 110 may receive 3D locations of the sensor data from the perception system 174 or determine the 3D locations. The 3D locations may then be converted to latitude and longitude or other coordinates which define the locations of the cells of the occupancy grid. In this regard, once a 3D location is converted to a latitude and longitude pair, it may be used to identify a cell of the occupancy in which that latitude and longitude pair would be located.

As an example, the 3D locations of LIDAR returns may be determined from the direction and range information by the perception system 174 and published to the other systems of the vehicle and/or may be determined by the processors 120 of the computing devices 110. However, in order to determine the three-dimensional (3D) locations of pixels from the camera images, the camera images may be annotated with 3D data with the help of an elevation map. Again, this may be performed by the processors 120 of the computing devices 110 and/or by the perception system 174 and published to the other systems of the vehicle 100. For instance, to get the 3D spatial information of each pixel in a camera image, the camera image may be projected onto the elevation map. This process effectively extends a ray from the camera pixel until it intersects the elevation map, and the point of intersection would be the 3D coordinate of the pixel. Other approaches may also be used to determine the 3D locations of pixels.

Returning to FIG. 10, at block 1050, a value for the first cell is generated using the first probability value and the second probability value. In other words, the occupancy grid 600 may be "filled" using the probabilities of a pixel belonging to a puddle and the probabilities of a return belonging to a puddle. For example, the locations of the pixels and returns may be projected into the cells of the occupancy grid 600. The corresponding probabilities for these pixels and returns may then be used to determine a likelihood of each cell containing a puddle. The likelihood for each cell may then be stored in that cell in the occupancy grid 600. For example, if the probability from a sensor output is denoted as x and the value stored in the occupancy grid cells as y, then y' (the prior value of y) may be updated with x (and thereafter with any subsequent value of x) as follows: $y=y'+\text{Logit}(x)-y\_0$. In this example, Logit refers to an inverse logistic regression function and y_0 is some constant initial value, such as 0 or more or less. In some instances, the prior term y_0 of a cell may be set to a value other than 0 if there is some prior knowledge about past history of puddles of a particular cell. Over time, as additional sensor data (or additional observations of a puddle) is generated this additional sensor data may be incorporated into the values stored in the occupancy grid.

In this regard, the more detections or observations of a puddle (e.g. sensor data), the more confident the vehicle's computing devices 110 may be in detecting the puddle. For example, if, over the course of 10 seconds, a puddle is detected from far distance with the camera, and subsequently closer with a LIDAR sensor, the vehicle's computing devices may be more confidence to the puddle's presence as if it had only been detected with the camera for a short period of time (e.g. 1 second or more or less). Mathematically, each observation of a puddle will increase the overall probability of a puddle. As an example, if there are ten observations for a cell of % probability, the overall probability of that cell would be greater than 80%. In this regard, confidence increases with the number of observations.

The probability of a cell containing a puddle may be denoted as z. Given the stored value of y, z may be determined using the function $z=\text{Sigmoid}(y)$. In this example, Sigmoid is a logistic regression function. If the value of z is greater than some predefined threshold, such as 0.8 or 80%, this may indicate that the cell contains a puddle. Of course, the value of the predetermined threshold may be dependent upon the data used to populate the occupancy grid and/or the hand tuned by human operators according to a desired precision and recall. This may affect how the vehicle will behave in response to the data within the cells of the occupancy grid (e.g. more or less conservatively with regard to puddles).

Figure 9:
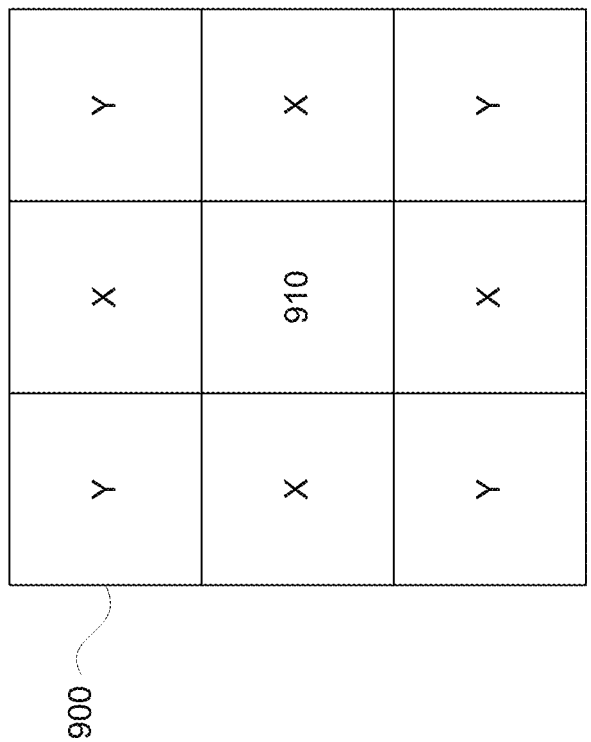
FIG. 9 is an example occupancy grid in accordance with aspects of the disclosure.

In some instances, a clustering algorithm may be used by the processors 120 of the computing devices 110 in order to group together high-probability cells. FIG. 9 provides an example representation of an occupancy grid 900 of 9 cells including cell 910, X cells that are directly adjacent to the cell 910, and Y cells that are diagonally adjacent to the cell 910. As an example, the clustering algorithm may be a 4-connected clustering algorithm. In this regard, if any of the four X cells directly adjacent to the cell 910 have values that indicate a puddle, such cells may be clustered with the cell 910. These clustered cells may be considered to be part of the same puddle. As another example, an 8-connected clustering algorithm, which also considers cells adjacent to the cell 910 in the diagonal directions, may be used. In this regard, if any of the four Y cells diagonally adjacent to the cell 910 have values that indicate a puddle, such cells may be clustered with the cell 910. These clustered cells may be considered to be part of the same puddle.

The clustering may also incorporate additional context from the elevation map. For instance, elevation may typically be lower where road edges are (e.g. due to intentional grading for water removal purposes). If puddles are known to frequently form parallel to road edges and across lower elevation parts of the road surface, where there are two cells or clusters of cells in close proximity at such locations, these cells or clusters of cells may be joined together. These larger clusters of cells may be used to determine an approximate outline of larger puddles. In other instances, some smoothing may be done to account for errors in the projection of the camera image onto the elevation map. For example, a morphological closing operation of the occupancy grid may be used to effectively increase the size of puddles during the clustering. This, in turn, may also compensate for errors in the projection.

Figure 8:
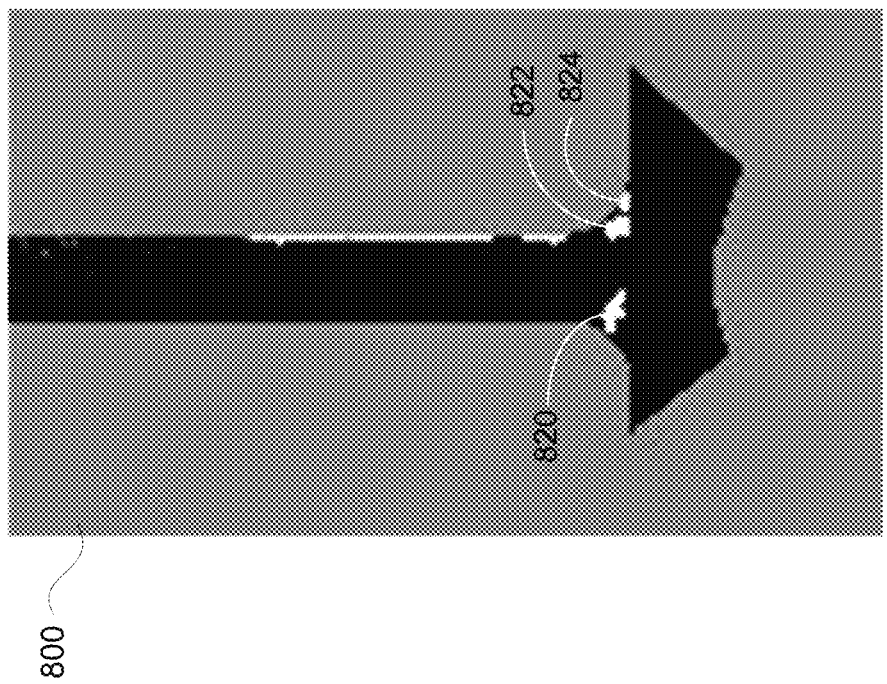
FIG. 8 is an example heat map generated from an occupancy grid in accordance with aspects of the disclosure.

FIG. 8 is an example of a 2D puddle map or a heat map 800 generated using probability values of cells of an occupancy grid for the area depicted in and using sensor data similar to that represented in FIGS. 7A and 7B. Rather than a side perspective view, FIG. 8 depicts a top-down view with the darkest area representing non-puddle areas of the intersection 210 and road 212, the gray areas represent areas beyond the surface of the intersection 210 and road 212, and the white areas represent areas having probability values that indicate puddles (e.g. sigmoid values that meet or exceed the predetermined threshold). In this example, the white areas 820, 822, 824 correspond to the puddles 720, 722, 724, respectively, as well as puddles in areas 750, 752, 754, respectively.

Returning to FIG. 10, at block 1060, the value for the first cell is used to control a vehicle in an autonomous driving mode. The resulting occupancy grid may be used in various ways. For instance, the occupancy grid and/or the sigmoid values may be published and sent to various systems of the vehicle 100. In some instances, before publishing, the computing devices 110 may perform some smoothing and clustering, and send information about the locations and sizes of puddles of a certain probability. For example, when a plurality of cells that are clustered together have a probability that meets the aforementioned predetermined threshold, the computing devices 110 may publish information such as "a puddle of size X was detected at location Y with probability Z". The occupancy grid and/or the aforementioned published information may be used as input to vehicle 100's motion control systems (deceleration system 160, acceleration system 162, steering system 164), planning system 168, and perception system 174. This may enable the vehicle 100 to avoid puddles and/or reduce the effects of the puddles on the control of the vehicle. For example, the planning system 168 may use the occupancy grid and/or the aforementioned published information to estimate that there would be reduced friction and thereby may make changes to speed or path planning to slow down and avoid the puddle. As another example, the vehicle's perception system 174 may use the occupancy grid to reason about things like splashes and other effects in order to disregard sensor data corresponding to spray and other water droplets which may appear as false objects. The perception system may function to filter our LIDAR returns if they appear to come from drivable objects like splashes, dust, fog, rain, smoke, etc. Making this decision requires high confidence that the LIDAR returns come from these drivable objects, as it is imperative that other objects (e.g. pedestrians, curbs, vehicles, etc.) are not incorrectly identified as splashes. This can be achieved by setting a relatively high confidence threshold on a splash detector identifying a LIDAR return as a splash (e.g. a deep net or other model that classifies LIDAR returns as splashes or not). The perception system can then use knowledge that another object passed through a puddle, to adjust the confidence threshold downwards for LIDAR returns that are behind the object and above the location of the puddle.

In addition, the occupancy grid and/or the aforementioned published information may be shared with other remote systems. For example, the occupancy grid may be shared with the server computing devices 410 which may generate a larger puddle map using the map information 200 and other map information (e.g. a larger geographic area such as a service area for the fleet of autonomous vehicles) and share such information with other vehicles of the fleet of autonomous vehicles, such as vehicles 100A and 100B. In this regard, the scale of the fleet of autonomous vehicles can be leveraged to detect when puddles on the road appear and have dried out.

In addition, the vehicles of the fleet of autonomous vehicles can receive the occupancy grid and/or the aforementioned published information from the server computing devices 410 and/or via vehicle to vehicle communications and incorporate this information into their own local puddle map, in other words, vehicles 100A, 100B could incorporate the details of an occupancy grid generated by vehicle 100 into their own respective own occupancy grids in order to enable the vehicles 100A, 100B to make better filtering, motion control, and routing decisions. For filtering and motion control, if vehicle 100A knows that there is a large puddle right around a bend because vehicle 100 detected it, vehicle 100A's computing devices may be able to slow down vehicle 100A or filter out splashes preemptively and/or sooner than if vehicle 100A did not receive the information. For an example of a routing decision, if there is a water pipe leak causing a big puddle on the road, this puddle may be large enough to create a blockage by closing down several lanes and slowing down traffic. If vehicle 100A receives this information from vehicle 100, the vehicle 100A's computing devices may make a decision to take a detour to avoid the blockage before getting stuck in traffic (even before such traffic information would be otherwise available to the vehicle 100A), which will actually be faster due to the blockage.

The features described herein may provide a useful, simple and practical way to map puddles using data generated from different types of sensors. For instance, using an occupancy grid may allow for the probability to be updated from different sensor readings in a way that is probabilistically accurate. In this regard, if a puddle is detected in a camera image or LIDAR sensor returns and then again in the following camera image or LIDAR sensor returns or even in a different sensor, this increases the likelihood that a puddle actually exists. The occupancy grid thus provides a framework for modeling that belief. Using an occupancy grid, a single 2D "puddle map" may be constructed from a variety of different sensors at different points in time (e.g. sensor data with different timestamps).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, a first probability value for puddling at a first location generated using sensor data from a first sensor;
generating, by the one or more processors, a first value for a first cell of a plurality of cells of a puddle occupancy grid based on the first location and the first probability value;
sending, by the one or more processors, the first value to a remote computing system;
receiving, by the one or more processors, a second value representing a second probability for puddling at a second location from the remote computing system;
incorporating, by the one or more processors, the second value into the puddle occupancy grid; and
using, by the one or more processors, the puddle occupancy grid to control a vehicle in an autonomous driving mode.

2. The method of claim 1, wherein the remote computing system is part of another vehicle.

3. The method of claim 1, wherein the remote computing system is a remote server computing system.

4. The method of claim 1, wherein the second value is received as part of a second puddle occupancy grid.

5. The method of claim 1, wherein generating the first value for the first cell includes first incorporating the first probability value and subsequently incorporating an additional probability value generated using second sensor data.

6. The method of claim 5, wherein incorporating the first probability value includes using an inverse logistic regression function.

7. The method of claim 6, wherein incorporating the additional probability value includes using the inverse logistic regression function.

8. The method of claim 1, wherein generating the first value for the first cell includes using a Sigmoid function to convert the first probability value to a probability of puddling at the first cell.

9. The method of claim 1, wherein using the puddle occupancy grid includes clustering cells of the occupancy grid, and wherein controlling the vehicle is further based on the clustered cells.

10. The method of claim 1, further comprising sending the puddle occupancy grid to the remote computing system.

11. The method of claim 1, wherein using the puddle occupancy grid to control the vehicle includes disregarding portions of sensor data.

12. The method of claim 11, wherein disregarding portions of sensor data includes filtering out splashes from sensor data.

13. The method of claim 11, wherein disregarding portions of sensor data includes adjusting a threshold value for classification of splashes.

14. The method of claim 1, wherein using the puddle occupancy grid to control the vehicle includes taking a detour to avoid a blockage related to puddling and traffic caused by the blockage.

15. The method of claim 1, wherein using the puddle occupancy grid to control the vehicle includes estimating changes in friction.

16. The method of claim 15, further comprising, using the estimated changes in friction to control one of a path or speed of the vehicle.

17. A system comprising one or more processors configured to:
receive a first probability value for puddling at a first location generated using sensor data from a first sensor;
generate a first value for a first cell of a plurality of cells of a puddle occupancy grid based on the first location and the first probability value;
send the first value to a remote computing system;
receive a second value representing a second probability for puddling at a second location from the remote computing system;
incorporate the second value into the puddle occupancy grid; and
use the puddle occupancy grid to control a vehicle in an autonomous driving mode.

18. The system of claim 17, wherein the one or more processors are further configured to send the puddle occupancy grid to the remote computing system.

19. The system of claim 17, wherein the one or more processors are further configured to use the puddle occupancy grid to control the vehicle by disregarding portions of sensor data.

20. The system of claim 17, wherein the one or more processors are further configured to use the puddle occupancy grid to control the vehicle by taking a detour to avoid a blockage related to puddling and traffic caused by the blockage.

* * * * *